United States Patent [19]
Horiuchi et al.

[11] Patent Number: 5,942,673
[45] Date of Patent: Aug. 24, 1999

[54] VEHICLE TESTING SYSTEM AND TESTING METHOD

[75] Inventors: Toshihiko Horiuchi, Ushiku; Takao Konno, Minori-machi; Toshiyuki Innami, Tsuchiura, all of Japan

[73] Assignee: Hitachi, Ltd., Japan

[21] Appl. No.: 08/863,915

[22] Filed: May 27, 1997

[51] Int. Cl.$^6$ .................................................. G01M 17/04
[52] U.S. Cl. .......................... 73/11.04; 73/11.07; 73/124; 73/669
[58] Field of Search ............... 73/11.04, 11.07, 73/117, 124, 669

[56] References Cited

FOREIGN PATENT DOCUMENTS

| 07035654 | 2/1995 | Japan . |
| 7-35654 | 7/1995 | Japan . |

OTHER PUBLICATIONS

Laboratory System Endurance Testing of Automobile Major Components, Miyajima et al., Mitsubishi Juko Giho, vol. 19, No. 1, Jan. 1982, pp. 26–34.

*Primary Examiner*—Richard Chilcot
*Assistant Examiner*—Eric S. McCall
*Attorney, Agent, or Firm*—Evenson, McKeown, Edwards & Lenahan, P.L.L.C.

[57] ABSTRACT

A vehicle testing system for simulating a vehicular motion and vehicular vibration caused thereby is provided to test a front or rear wheel section of a four-wheel vehicle. The testing system comprises a vehicle suspension system, a wheel attached thereto, a first actuator for exciting the wheel based on data concerning road and other conditions, and a dummy vehicle body linked to the suspension system and having a frame, a reaction measuring device linked to the frame and a second actuator for exciting the frame. When the wheel is excited corresponding to the data on road and other conditions, the suspension system and the dummy body vibrate. The reaction force generated by the suspension system is measured by the reaction measuring device. Using the measured value, the digital computer calculates vibrational response after an elapse of a predetermined time of a body numerical model and the like imaginary linked with the dummy body to excite and control the first actuator so that the vibrational response is made by the dummy body and the suspension system after the elapse of the predetermined time. Accordingly, it becomes possible to conduct a test similar to an actual car test by using a partial model composed of parts of an actual vehicle.

13 Claims, 14 Drawing Sheets

VEHICLE TESTING SYSTEM AND TESTING METHOD

This application claims the priority of Japanese Application No. 8-129602, filed May 24, 1996, the disclosure(s) of which is (are) expressly incorporated by reference herein.

BACKGROUND OF THE INVENTION

1. Field of the Invention

The present invention relates to method and apparatus for testing a vehicle such as an automobile, and for testing a suspension system of the vehicle.

2. Description of Related Art

A vehicular suspension system is an important part which affects riding comfort in a vehicle, and it is essential to make a preliminary evaluation of the performance thereof in developing the vehicle. Thereafter, conventionally, the vehicular suspension system has been tested either by driving an actual car on a road or by using an actuator. The latter is carried out by placing each wheel of an actual car on an exciting unit and exciting the body by an actuator to simulate road conditions. The body is supported by the wheels and the suspension system and the performance of the suspension system is evaluated by measuring the body motion. An example thereof has been described by Miyajima et. al. "Laboratory System Endurance Testing of Automobile Major Components", Mitsubishi Juko Giho, Vol. 19, No. Jan. 1, 1982, pp. 26–34. In this example, a vibration having a waveform such as obtained by an actual vehicle running test is reproduced by an actuator. Further, Japanese Patent Laid-open No. Hei. 7-35654 has disclosed a so-called active suspension testing system in which rollers are driven by an actuator so as to simulate irregularities of a road in a chassis dynamometer for driving an actual car on a bench of the rotating rollers.

However, the actual vehicle running tests described above can be used only under a certain conditions in which several parameters (e.g., structure of body, road surface condition, running condition, etc.) are all predetermined, so that it has been difficult to apply the result of the experiment to the evaluation of other conditions. In addition, recently developed active suspension systems which introduce a feedback signal to a controller of a suspension, enlarge the scale of the test and lack generality because the actual vehicle is used. The same applies also in the case of the exciting test. Since the active suspension system requires information on operating feedback signals, those exciting methods which do not provide such information are unable to deal with such suspension.

Accordingly, it is an object of the present invention to provide a vehicle testing method and apparatus which allow performance or durability testing of the suspension system, including active suspension systems, to be carried out readily under various conditions.

SUMMARY OF THE INVENTION

According to a first embodiment of the invention for achieving the aforementioned object, a vehicle testing system comprises a frame; at least one first exciting unit whose one end is fixed and whose other end is connected with the frame; a reaction measuring unit attached to the frame for measuring reaction force generated by a specimen linked to the frame; a computing unit for computing a control signal for controlling the first exciting unit based on a value of reaction force measured by the reaction measuring unit; and a second exciting unit whose one end is fixed and whose other end is disposed in contact with the specimen.

According to a second embodiment of the invention for achieving the aforementioned object, a vehicle testing system comprises a dummy body equipped with a frame and at least one first exciting unit whose one end is fixed and whose other end is connected with the frame; a reaction measuring unit attached to the frame for measuring reaction force generated by a suspension system linked to the frame; a digital computer for computing a control signal for controlling the first exciting unit based on a value of reaction force measured by the reaction measuring unit; and a second exciting unit whose one end is fixed and whose other end is disposed in contact with the suspension system.

Preferably, the digital computer comprises a storage unit for storing numerical model data for a vehicle-body; a body motion calculating unit for calculating a motion of the body using the body numerical model data; and a time control unit for controlling the operation of the reaction measuring unit and the body-motion calculating unit.

The second exciting unit may be connected with a second digital computer comprising a memory for storing vehicle running conditions and road surface conditions; a control-signal calculating unit for outputting a signal to control the second exciting unit using the stored running conditions and road surface conditions; and a second time control unit for controlling operations of the control-signal calculation means.

The second exciting unit may comprise rotary pulleys; a belt spanned around the pulleys; and an exciter for exciting the belt. Or, the second exciting means may be provided with a second reaction measuring unit for measuring a reaction force generated by the second exciting unit such that the exciting signal calculating unit calculates the signal for operating the second exciting unit based on the output of the second reaction measuring unit.

The digital computer may have an output unit capable of outputting a calculation result of the body motion to the outside unit at a predetermined timing and the digital computer may be integrated with the second digital computer.

According to a third aspect of the invention for achieving the aforementioned object, a method for testing a vehicle suspension system by using a dummy vehicle body comprises steps of measuring a reaction force generated by the suspension system linked to the dummy body; calculating a motion of the dummy body after elapse of a preset time following measurement of the reaction force, using a body numerical model stored in advance; calculating a signal for controlling the dummy-body motion based on the calculation result of the body motion; and outputting the control signal after the preset time.

The vehicle testing method may further comprise steps of calculating a signal for exciting the wheel by using previously stored vehicle running state and road surface data; and outputting the exciting signal and a running state based on a calculated value of the exciting signal.

According to a fourth aspect of the invention for achieving the aforementioned object, a method for testing a vehicle suspension system by using a dummy vehicle body comprises steps of measuring a reaction force generated by the suspension system; calculating the motion of a wheel after a preset time following measurement of the reaction force, using previously stored data on wheel exciting state and the measured value of the reaction force with respect to previously stored wheel numerical model data; finding an exciting signal for causing a motion of the part linking the suspension system and the wheel to agree with the calculated wheel motion; outputting the exciting signal after a preset time; calculating a body motion after a preset time following measurement of the reaction force, using previously stored data on wheel exciting state; determining an exciting signal for causing the motion of the dummy body to agree with the calculated body motion; and outputting the exciting signal after the preset time.

The wheel exciting state may be calculated using previously stored vehicle running state and road surface state data, or the calculation result of the motion of the dummy body may be output after the preset time, to feed back to the suspension system.

The present invention allows performance testing and durability testing equivalent to tests on an actual car, because the body motion may be computed by the digital computer and may be simulated by the actuator. Further, it allows the test to be readily conducted because the performance may be evaluated on different bodies simply by changing the numerical model data to be input to the computer. It allows the test to be performed readily on different road surface conditions, simply by changing exciting conditions for exciting the wheel. It also allows the tests to take into account complicated phenomena (slip, jump and the like) which occur at the wheel section, because the wheel section is replaced by the actuator and the motion is calculated on the computer.

The present invention also allows tests to be conducted under the same conditions as with an actual car, because a signal necessary for a control system of the active suspension system is output based on the calculation result of the motion.

Other objects, advantages and novel features of the present invention will become apparent from the following detailed description of the invention when considered in conjunction with the accompanying drawings.

DESCRIPTION OF PREFERRED EMBODIMENTS

Several preferred embodiments of the present invention will be explained below with reference to the drawings.

Figure 1:
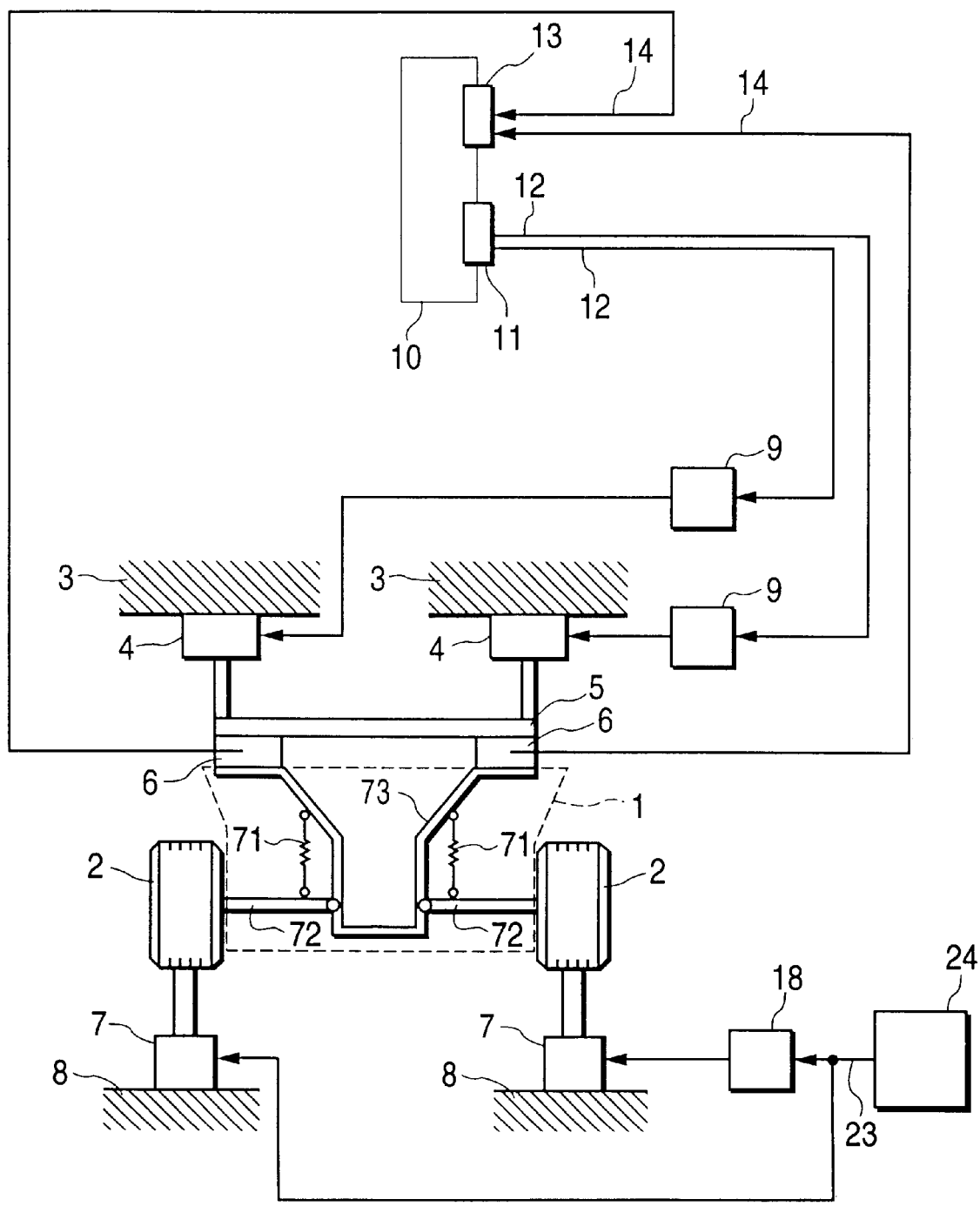
FIG. 1 is a block diagram showing a first embodiment of a vehicle testing system of the present invention.

FIG. 1 is a block diagram showing a first embodiment of the present invention, including a vehicle with a pair of wheels, which is to be tested. That is, this system is used for testing a front wheel section or rear wheel section of a four-wheel car. Wheels 2 are anchored to one end of a suspension system 1 of the vehicle and are linked to or in contact with first actuators 7 fixed to bases 8. Second actuators 4 fixed to a rigid wall 3, a frame 5 and reaction measuring devices 6 mounted to the frame compose a dummy vehicle body to which the other end of the suspension system 1 comprising springs 71, shafts 72, a frame 73 and the like is connected. Here, as many actuators are used as necessary in order to simulate the motion of the body. Further, because the reaction measuring device 6 is what measures reaction force applied to the dummy vehicle body from the suspension system 1, it may be installed at any place and its position is not limited to that shown in FIG. 1.

The actuators 7 are controlled by a controller 18 and are driven based on a signal generated by a signal generator 24 and transmitted by signal transmitting path 23. The exciting signal generated by the signal generator 24 applies to the wheels 2 substantially the same vibration as that applied to the wheels in a vehicle running on a road. Preferably, the exciting force applied to each wheel is different, in order to reproduce actual road conditions. Measured values of the reaction force measured by the reaction measuring devices 6 are transmitted to signal input unit 13 via a signal transmitting path 14, and are then input to a digital computer 10. The digital computer 10 outputs an exciting signal via a signal output device 11, for transmission to controllers 9 of the actuators 4, via signal path 12.

In the present embodiment constructed as described above, the signal to be transmitted is a voltage, cables are used as the signal transmitting path, an A/D converter is used as the signal input device and a D/A converter is used as the signal output device, for example. However, those components are not limited to those described above so long as in the same manner.

As described above, because a pair of wheels and the suspension system may be tested, the present embodiment allows reproduction of not only vertical motion but also rotary motion in the axis orthogonal to an axle, and the actual motion of the body to be simulated faithfully. However, if the motion is supposed to be symmetrical on the right and left, the test may be done by testing just one wheel and its suspension system.

Figure 2:
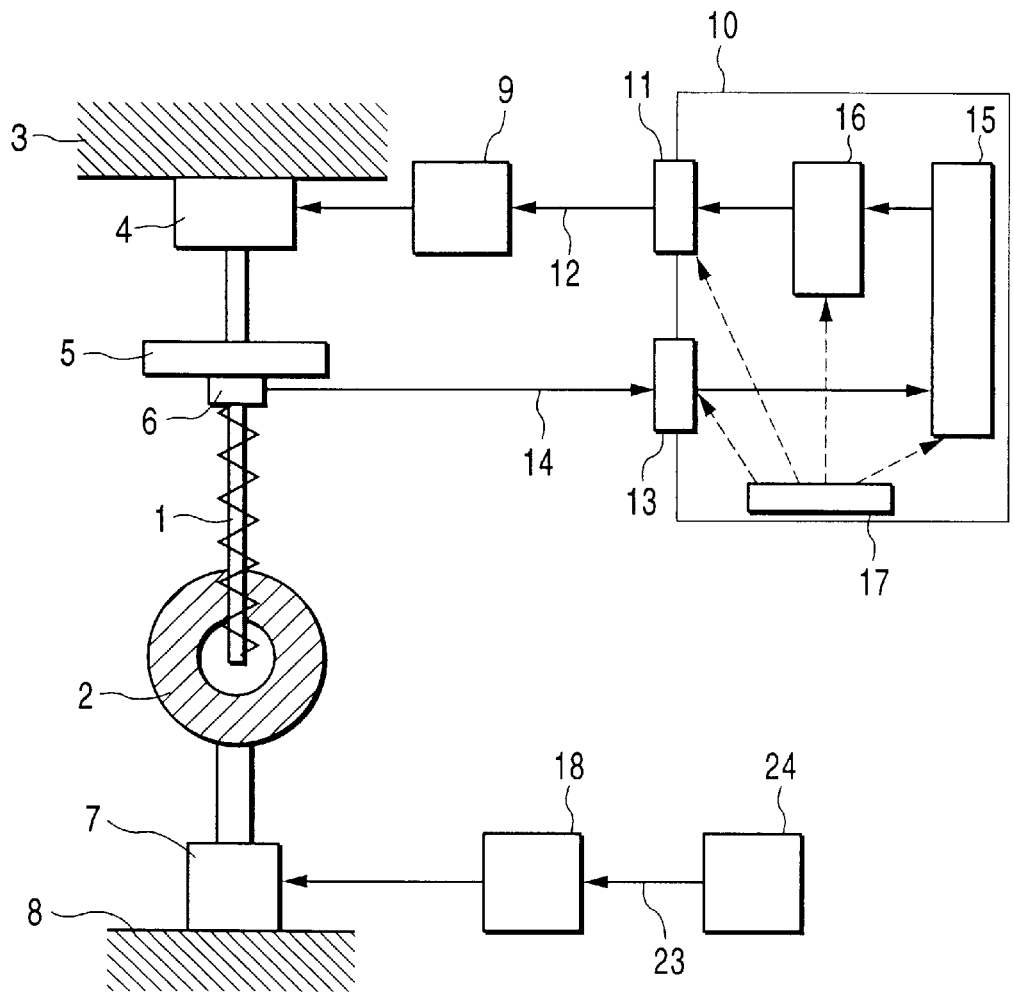
FIG. 2 is a detailed block diagram of a second embodiment of the vehicle testing system of the present invention.

FIG. 2 shows a second embodiment of the present invention. Although the testing one wheel will be explained in the following embodiments to simplify the explanation, the inventive system and the method are applicable also to the testing two or more wheels as a matter of course.

In the digital computer 10, the measured value of the reaction force received by the signal input unit 13 is input to body-motion calculating means 15. A numerical model of the body motion expressed as an equation of motion is input and held in advance in an auxiliary storage device (not shown) of the digital computer 10, and the body-motion calculating unit 15 calculates the state of motion of the vehicle using the numerical model of the body motion. Here, the numerical model is expressed by a matrix of mass, a matrix of damping and a matrix of stiffness which govern and can be obtained by breaking the actual vehicle, which is a continuum, into a large number of elements by means of the finite element method or the like. Further, the equation of motion is numerically integrated with respect to time by substituting the measured value of the reaction into the term of external force of the equation to calculate the state of motion at a predetermined time after measurement of the reaction. While the central difference method is used for the numerical integration, the method is not limited only to that, and other various methods may be applied.

This result is input to control-signal calculating unit 16 to generate, after the predetermined period of time, a control signal, which is supplied to the actuator so that the motion at the point connecting the suspension system 1 and the body agrees with the result of calculation of the body-motion calculating unit 15. The control signal is output from the signal output unit 11 to the controller 9 of the second actuator 4 via the signal transmitting path 12.

Figure 18:
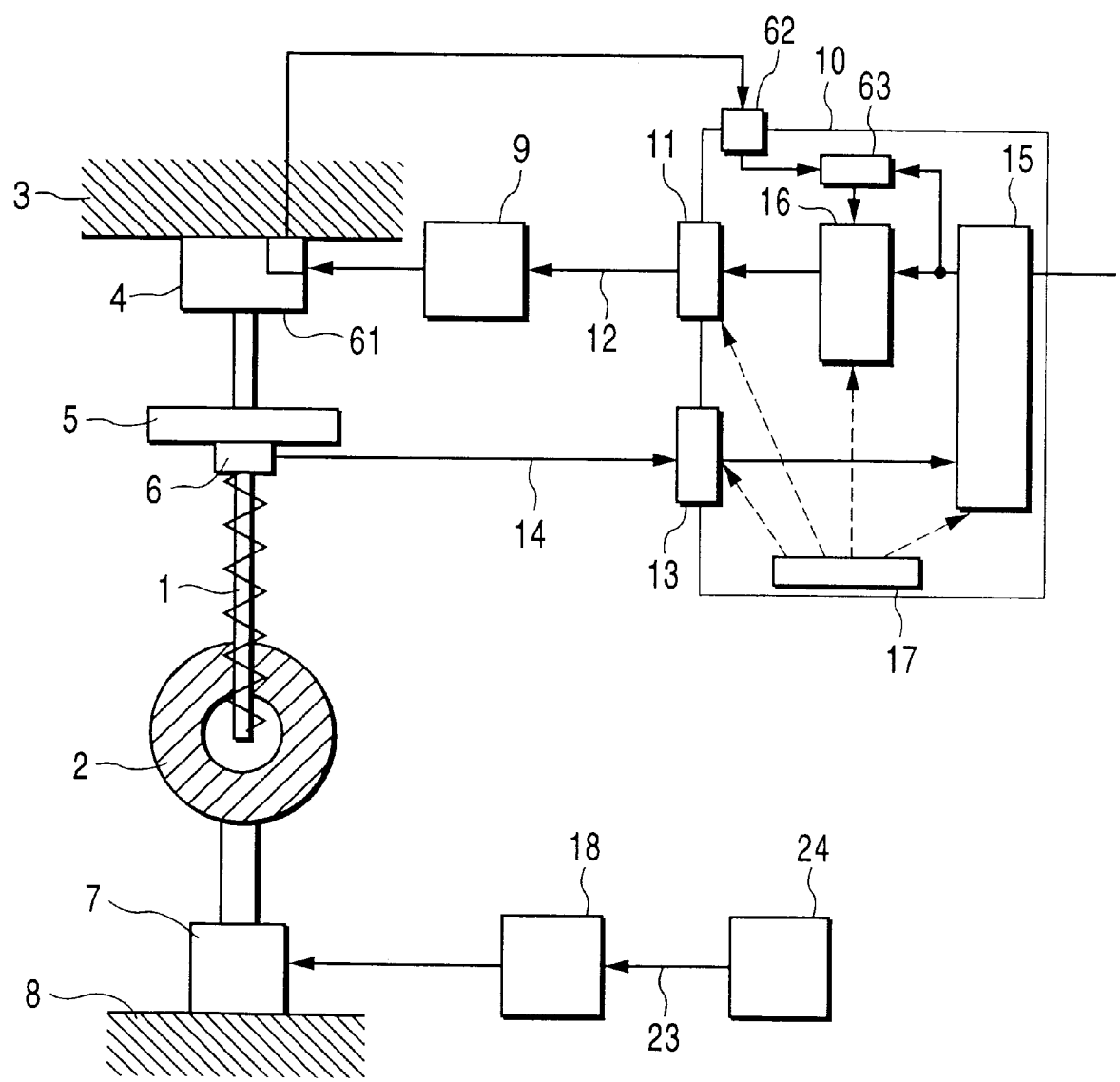
FIG. 18 is a block diagram showing a variation of the second embodiment of the vehicle testing system of the present invention.

The exciting-signal calculating means 16 corrects the calculation result calculated by the body motion calculating means 15 taking into account the characteristics of the actuator, in order to cause the motion at the connecting point to agree with the result. Alternatively, as shown in FIG. 18, displacement measuring means 61 is provided on the actuator 4 to input the measured result to the digital computer 10 via a data input device 62. Furthermore, a comparison unit 63 may also be provided within the digital computer 10, to compare the measured result with the result calculated by the body motion calculating unit 15, to adjust a correction value.

Time control unit 17 controls the above-mentioned operations so as to actually cause the same motion as provided by the calculation result of the motion, after passage of the predetermined time.

The present embodiment enables a test which duplicates the driving of an actual car, without exciting the actual body, so that the functions of the suspension system may be evaluated economically. Further, the performance may be evaluated with respect to various use conditions or body conditions just by changing the body numerical model.

Figure 3:
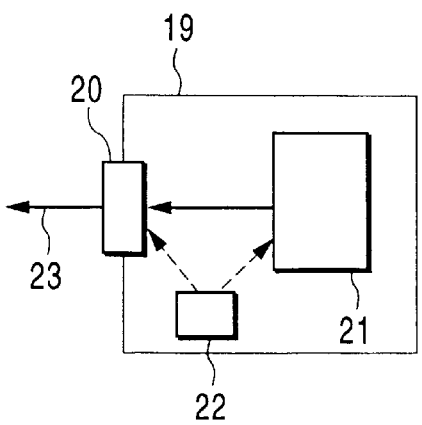
FIG. 3 is a detailed block diagram of a second digital computer according to a third embodiment vehicle testing system of the present invention.

A third embodiment of the present invention will be explained with reference to FIGS. 2 and 3. Instead of the signal generator 24, this embodiment uses a second digital computer 19 comprising at least a data storage unit 21, signal output unit 20 and time control unit 22. The exciting signal data based on road conditions and running conditions are stored in the data storage means 21. The time control unit 22 controls the data output sequentially from the signal output unit 20 and the first actuator 7 excites the suspension system 1 based on that.

The present embodiment makes it possible to deal with various conditions of the exciting experiment, just by changing the data stored in the data storage means 21.

A fourth embodiment of the present invention will be explained with reference to FIG. 4, in which exciting-signal calculating unit 34 and signal output unit 33 are added to the second digital computer 19, and signal input unit 35 is added to the digital computer 10. The data on road conditions and running conditions are stored in the data storage unit 21. Such data are input sequentially to the exciting-signal calculating unit 34 to calculate the exciting signal. While the conditions for exciting the wheel may vary depending on the running velocity even under the same road conditions, such exciting conditions may be realized by using such data.

Further, a running condition (running state) at a certain time is output from the signal output means 33 and is input to the digital computer 10 via the signal input path 35. In a running state, a change in velocity, for example, causes an inertia force, and a motion normal to the running direction causes a centrifugal force, respectively, influencing the motion of the body. The body motion calculating unit 15 numerically integrates the equation of motion, using also such motion state. It is of course possible to consolidate the signal output units 33 and 20 into one signal output unit, and to consolidate the signal input units 35 and 13 into one signal input means.

The present embodiment allows the performance of the suspension system to be readily evaluated even when the running condition is different, just by replacing the data. Further, because the influence of the running condition on the motion of the body is added, it is possible to carry out the test at high precision.

Figure 5:
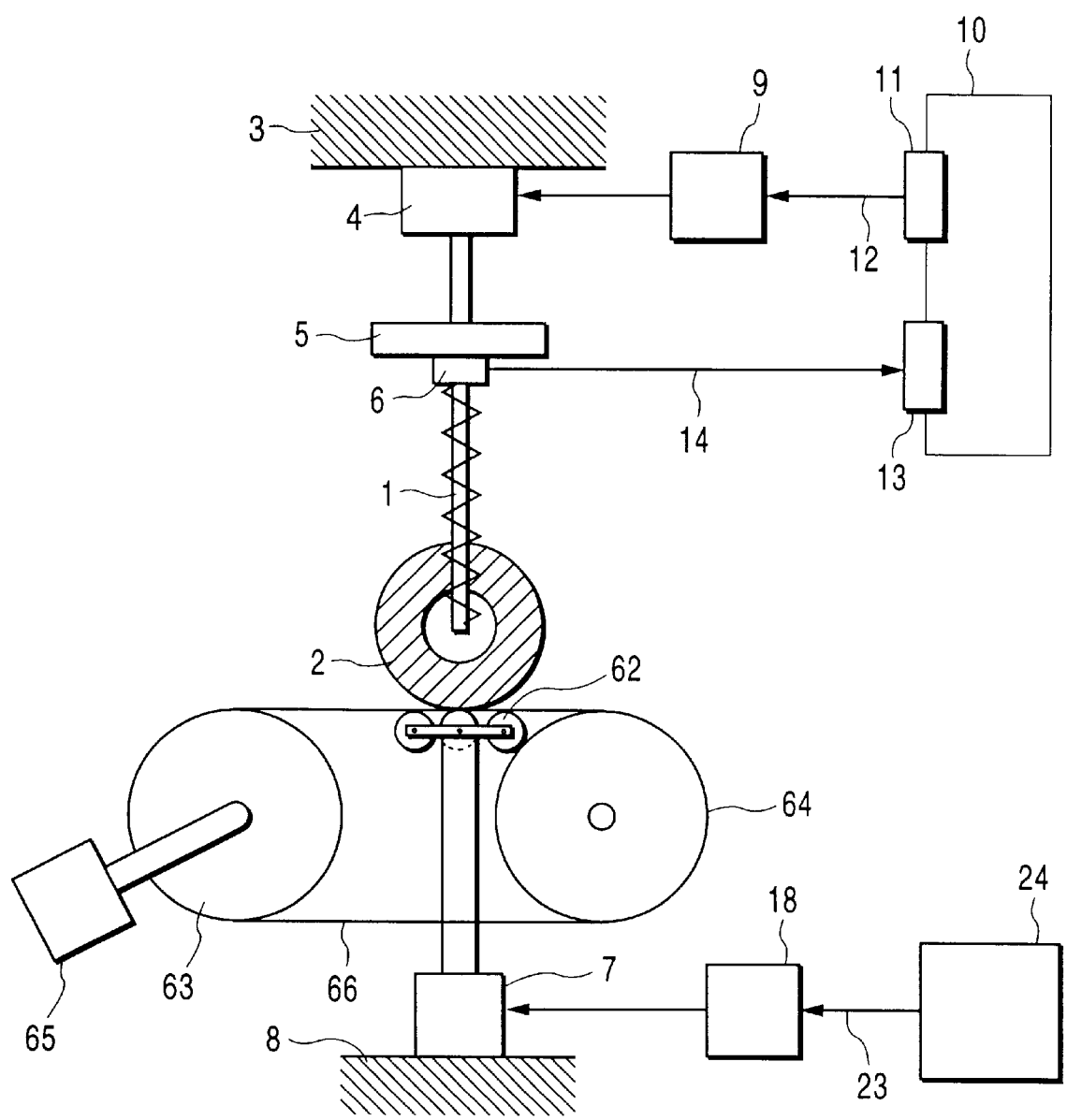
FIG. 5 is a block diagram showing a fifth embodiment of the vehicle testing system of the present invention.

A fifth embodiment of the present invention will be explained with reference to FIG. 5. While the wheel 2 is directly excited in the first embodiment (FIG. 1), in this embodiment a rotary belt 66 is used as a dummy road surface. The inner face of the belt 66 is excited by a road surface simulating section 62 mounted at the end of the first actuator 7. The belt 66 is arranged on the rotary pulleys 63 and 64, rotary pulley 63 being driven by a driving motor 65. An actual running vehicle may be simulated precisely by controlling the speed of the motor 65 corresponding to the running velocity of the dummy vehicle. It is noted that although only one wheel is shown in FIG. 5, a motion of an actual vehicle may be simulated more accurately by providing four belts and by placing each wheel on each belt to drive and turn each belt independently or in concert. It is needless to say that this wheel exciting method may be applied also to the third and fourth embodiments. When this exciting method is applied to the third embodiment, the running velocity may be changed corresponding to the running condition data, because the running velocity of the belt 66 may be controlled by the second digital computer 19. It is also possible to use rollers instead of the pulleys and the belt, and to excite the rollers directly, which allows the structure to be simplified.

The present embodiment allows data to be obtained which are closer to the actual condition, because the performance of the suspension system may be evaluated while rotating the wheel.

Figure 6:
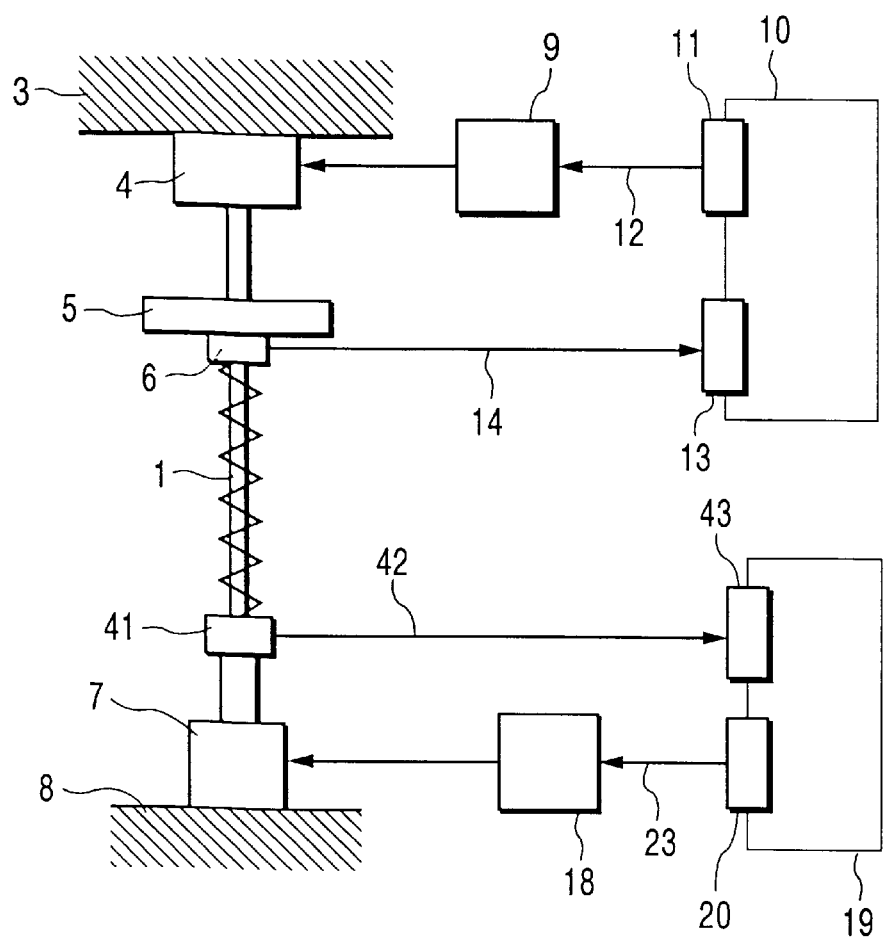
FIG. 6 is a block diagram showing a sixth embodiment of the vehicle testing system of the present invention.

FIG. 6 shows a sixth embodiment of the present invention. Instead of exciting the suspension system through the intermediary of the wheel 2, as in the first embodiment of FIG. 1, in this embodiment reaction measuring unit 41 is provided in the suspension system 1, and the first actuator 7 directly excites the suspension system 1. The signal output from the signal output unit 20 of the second digital computer 19 is input to the controller 18 of the actuator 7, via the signal transmitting path 23. A measurement signal from the reaction-measuring unit 41 is transmitted to signal input unit 43 via signal transmitting path 42, to be input to the second digital computer 19.

Figure 7:
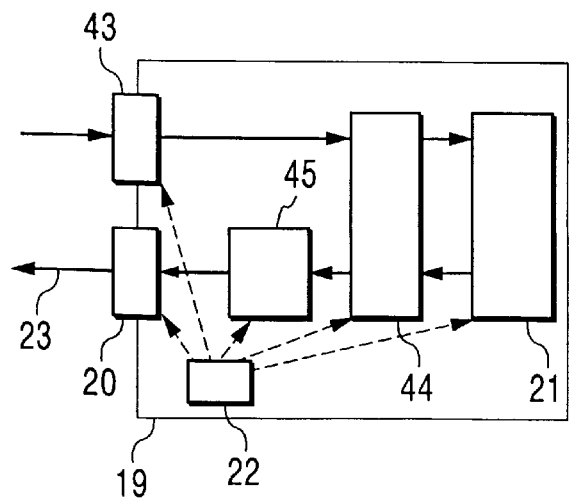
FIG. 7 is a detailed block diagram of the second digital computer in FIG. 6.

The second digital computer 19 used in the sixth embodiment will be explained in detail with reference to FIG. 7. It is noted that the second digital computer 19, which is similar to that in the second embodiment, is provided with a data storage unit 21, wheel-motion calculating unit 44, exciting signal calculating unit 45 and time control unit 22. The wheel-motion calculating unit 44 calculates a motion of the wheel in accordance to a numerical model of motion of the wheel, which was input and stored in advance in the auxiliary storage device (not shown) of the second digital computer 19. Here, a measured value measured by the reaction measuring unit 41, received via the signal input unit 43, and the data on road surface condition and running condition stored in the data storage unit 21 are substituted for terms of external force in the equation of motion describing the numerical model. The equation of motion is numerically integrated to calculate a state of motion after a predetermined time following measurement of the reaction. Although the central difference method is used for the numerical integration in the present embodiment, the invention is not so limited.

The exciting signal calculating unit 45 calculates a control signal to be given to the actuator so that the motion at the point connecting the suspension system 1 and the wheel agrees with the calculation result of the wheel-motion calculating unit 44 after a predetermined time, and outputs it from the signal output unit 20. The time control unit 22 controls the above-mentioned operations so that the motion of the calculated result is actually made after the predetermined time.

The present embodiment enables a test which substantially duplicates an actual vehicle running test, because the actuator simulates the motion of the wheel and the motion of the suspension system. Further, it is economical because it allows the test to be conducted corresponding to various wheel conditions and road surface conditions just by changing the numerical model and the equation of motion.

Figure 8:
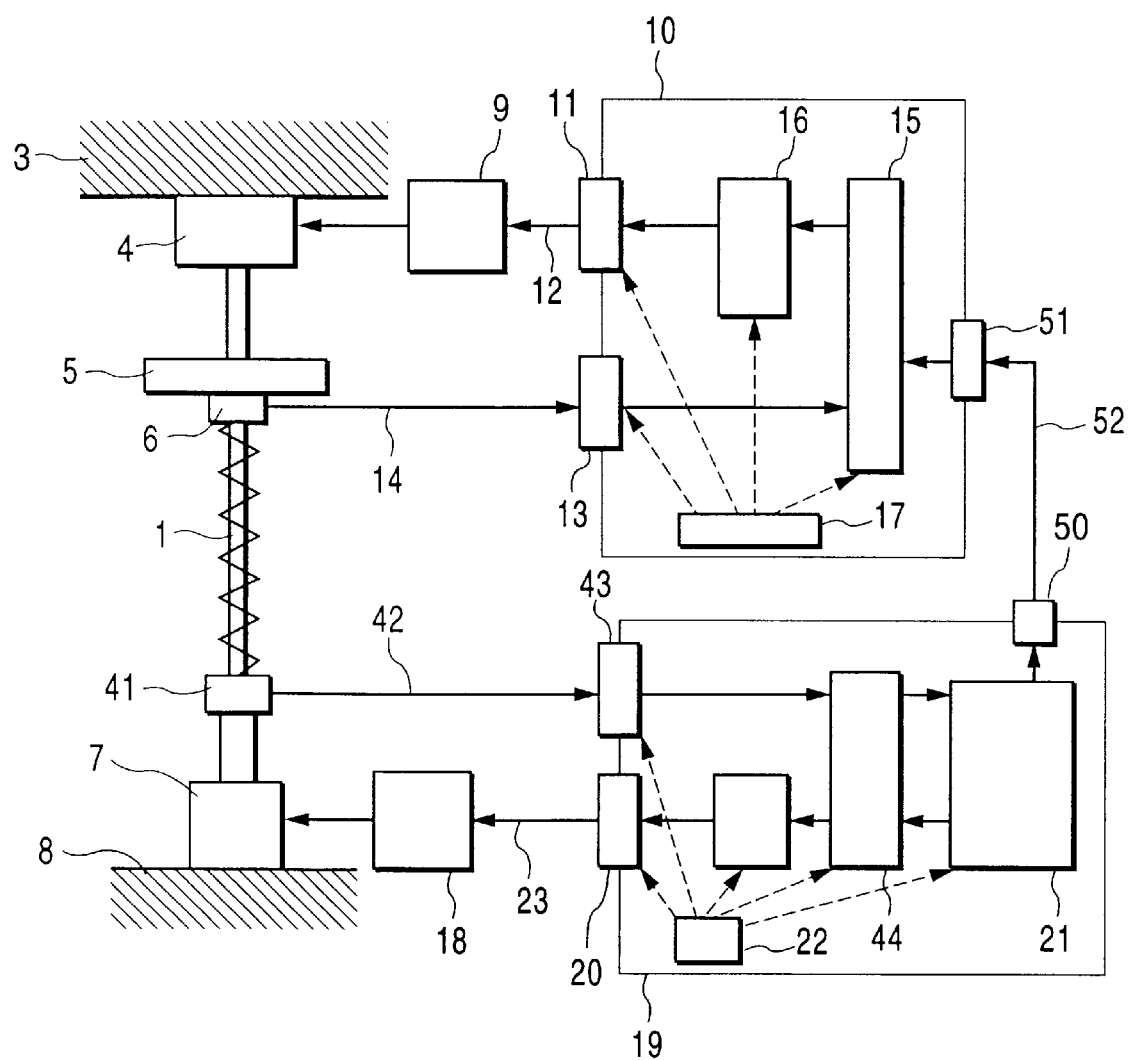
FIG. 8 is a block diagram showing a seventh embodiment of the vehicle testing system of the present invention.

A seventh embodiment of the present invention will be explained with reference to FIG. 8. The present embodiment is the same as the sixth embodiment but signal output unit 50 is added to the second digital computer 19, and signal input unit 51 is added to the digital computer 10, similarly to the fourth embodiment shown in FIG. 4. Data on the road condition and running condition are stored and held in the data storage unit 21 composed of a ROM or a RAM, and are input sequentially to the wheel-motion calculating unit 44. This calculation result is input to the exciting signal calculating unit 45, which calculates the exciting signal. The data on the running condition is input to the signal input unit 51 of the digital computer 10 from the signal output unit 50, via signal transmitting path 52. This running condition is used also in calculating the motion of the body. It is noted that any type of data input/output and transmitting units may be used, so long as they can achieve the above-mentioned functions.

Figure 4:
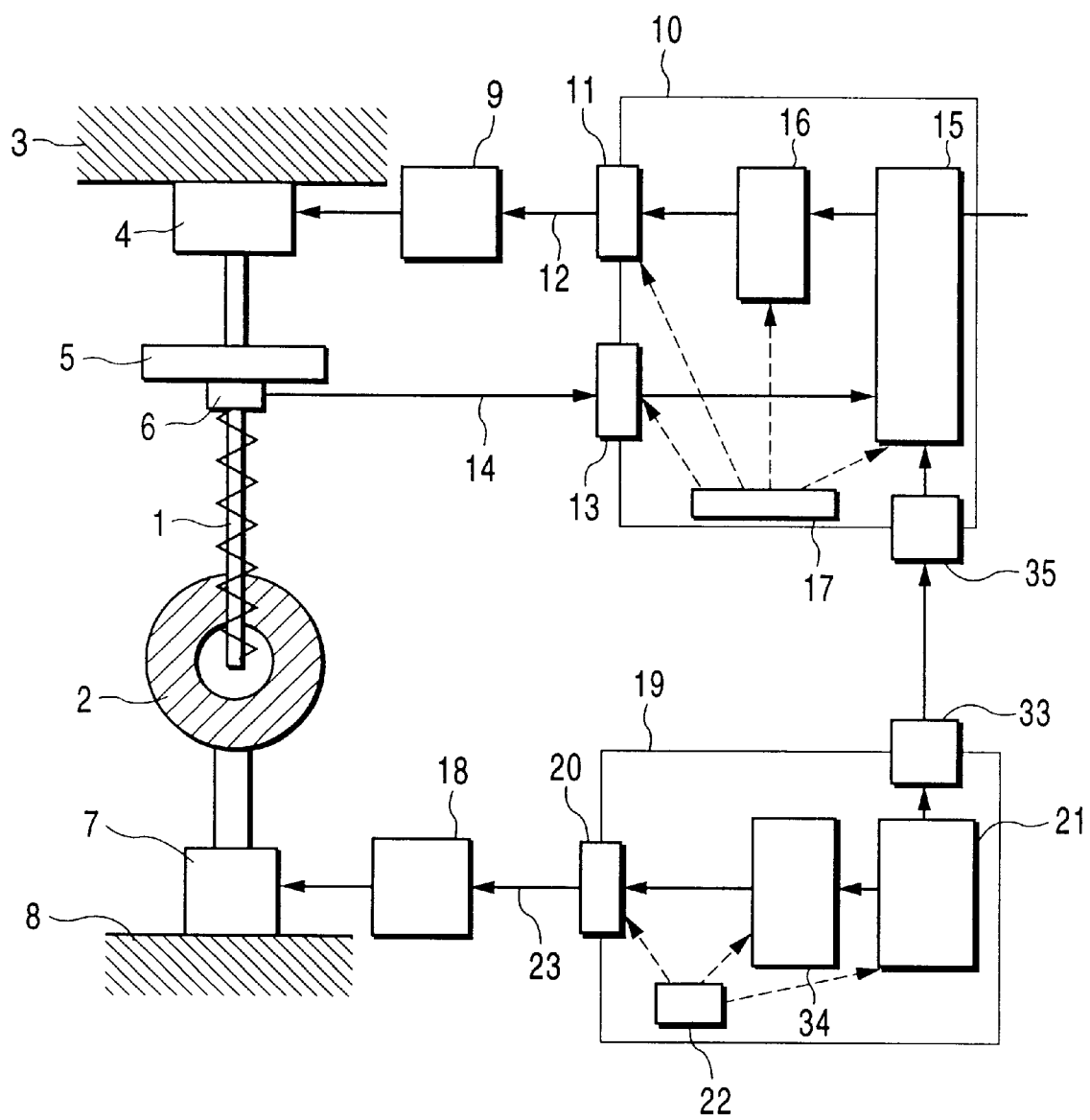
FIG. 4 is a block diagram showing a fourth embodiment of the vehicle testing system of the present invention.

The present embodiment allows the performance of the suspension system to be readily evaluated even when the running condition is different, just by changing the data, similarly to the fourth embodiment shown in FIG. 4.

Figure 9:
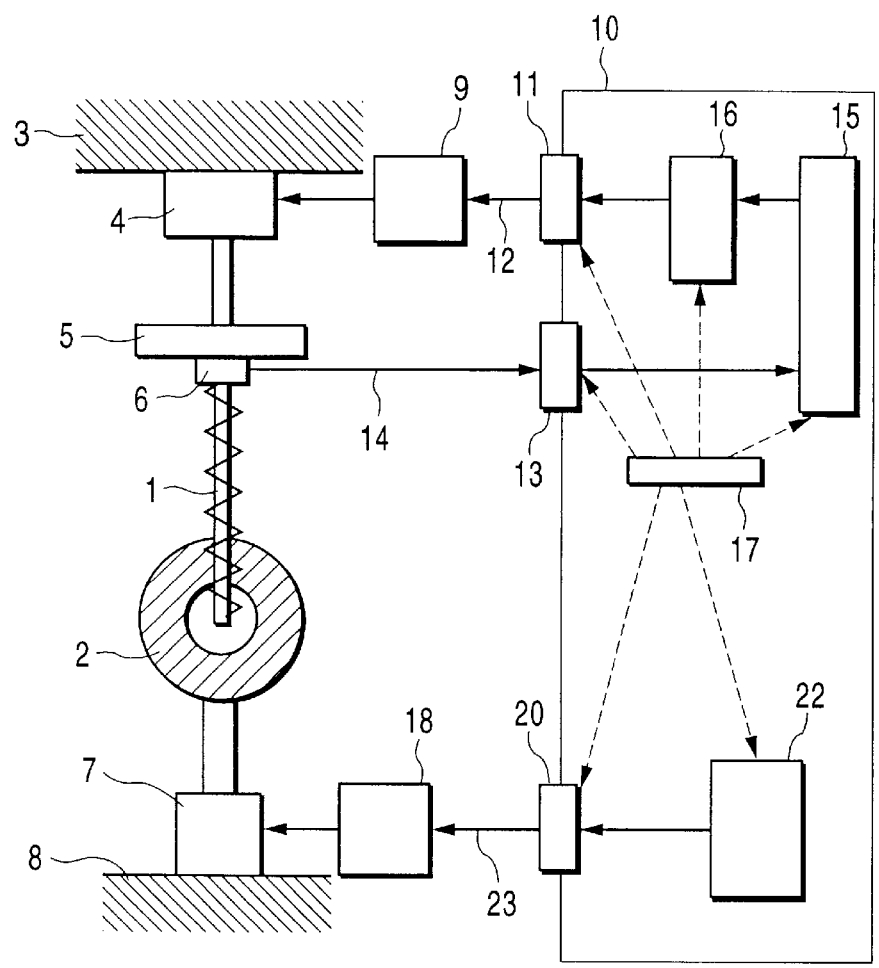
FIG. 9 is a block diagram showing an eighth embodiment of the vehicle testing system of the present invention.

An eighth embodiment of the present invention will be explained with reference to FIG. 9. Instead of using both the digital computer 10 and the second digital computer 19 (as in the third embodiment shown in FIG. 3), only the digital computer 10 is used in this embodiment. It is of course apparent that the function of those two digital computers may be replaced with one computer also in the first through third embodiments.

The present embodiment allows the structure to be simplified because only one digital computer is needed. In particular, although an error related to the transmission of data between the two digital computers may occur in the embodiments shown in FIGS. 4 and 8, the present embodiment allows this error to be reduced and the tests to be conducted at high precision.

Figure 10:
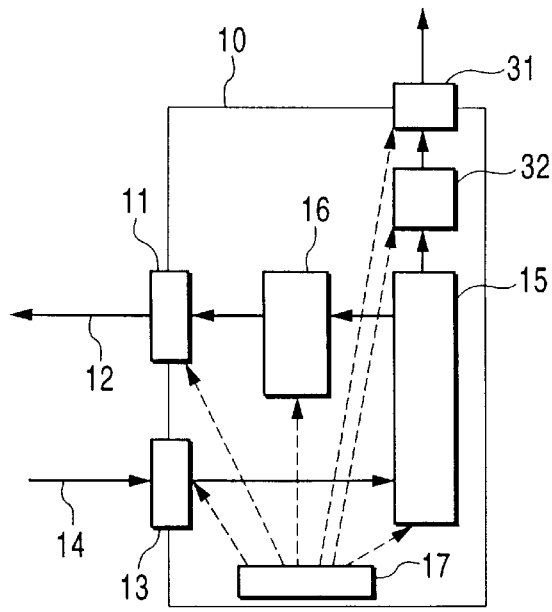
FIG. 10 is a block diagram showing a ninth embodiment of the vehicle testing system of the present invention.

Next, a ninth embodiment of the present invention will be explained with reference to FIG. 10, in which signal calculating unit 32 and signal output unit 31 are provided within the digital computer 10, to output the result of calculation of the body motion. It is noted that the signal calculating unit 32 may be replaced with the control-signal calculating unit 16 and the signal output unit 31 may be replaced with the signal output unit 11. Each unit provided within the digital computer is controlled by the time control unit 17 so that a motion state which agrees with the calculation result is made after a predetermined period of time.

Because the present embodiment allows the motion of the body to be determined in the same condition as if a sensor is attached to the actual body, the performance of the suspension system may be readily evaluated. Further, in the case of active suspension systems which requires the body motion state as a feedback signal, the output signal may be used as the feedback signal.

Figure 11:
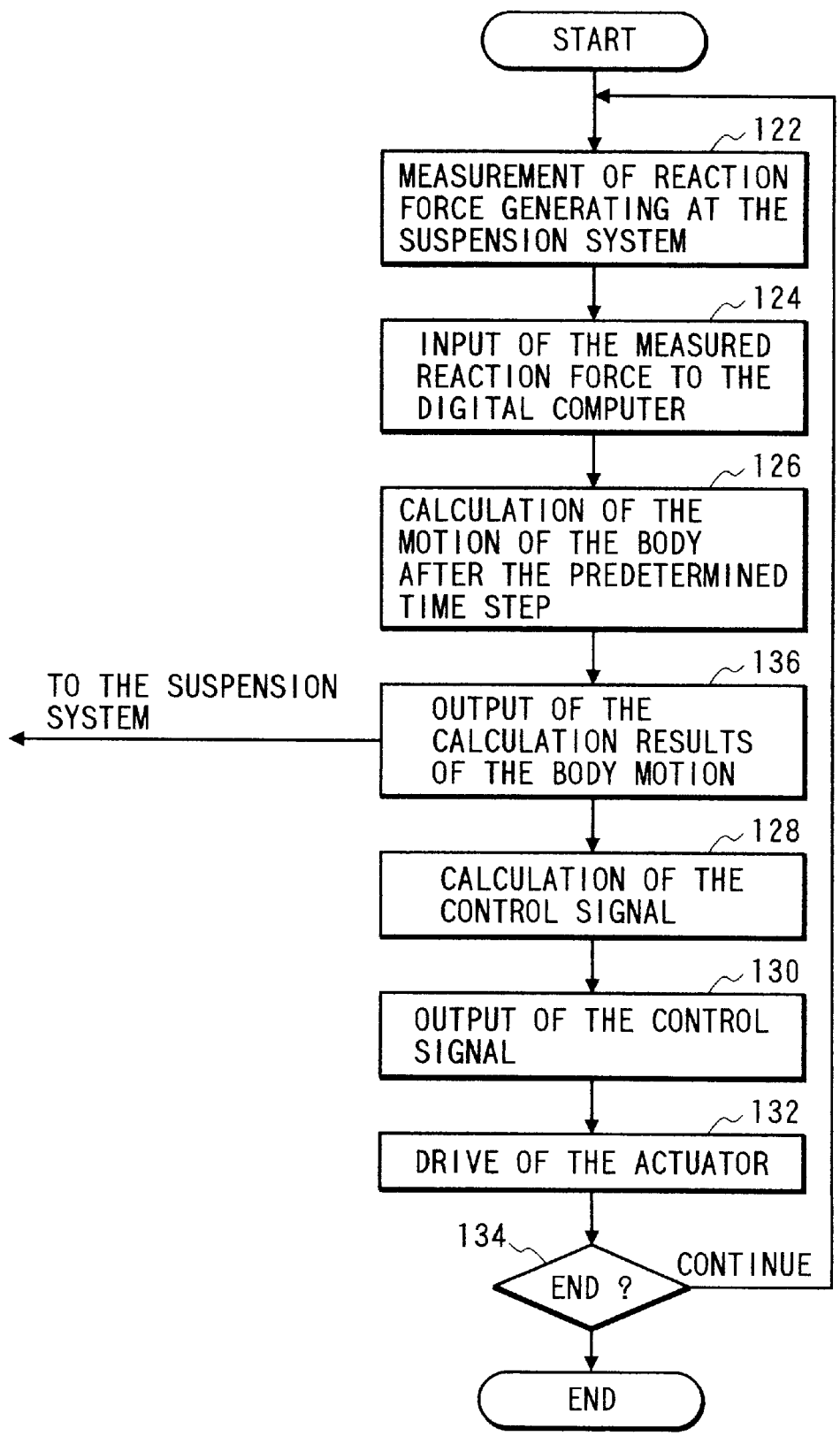
FIG. 11 is a flowchart of one embodiment of a vehicle testing method of the present invention.

Some embodiments of the inventive method for testing the vehicular suspension system will be explained below with reference to the drawings. FIG. 11 is a flowchart which shows the processing when the testing system shown in FIG. 1 is used. As shown in FIG. 1, the suspension system 1 (i.e., the subject of the test) and the wheels 2 connected to one end of the suspension system 1 are connected with or contact the wheel actuator 7 fixed to the bases 8. The other end of the suspension system is connected to the dummy body equipped with the frame 5 and the actuator 4 connected to the frame 5 and fixed to the rigid walls 3. The signal generator 24 generates a signal simulating the road surface condition, and the actuator 7 excites the wheels 2. The suspension system 1 is excited and tested through the following procedure:

(1) Measure reaction force generated by system 1 (Step 122);

(2) Input measured value of the reaction force to the digital computer (Step 124);

(3) Calculate a motion of the vehicle body after the predetermined time following measurement of the reaction, using the measured value of the reaction force in (2) based on the body numerical model data input in advance to the digital computer (Step 126);

(4) Calculate the control signal which causes a motion state of the dummy body that agrees with the calculated result of the body motion (Step 128);

(5) Output the control signal (Step 130);

(6) Drive the actuator based on the control signal (Step 132); and (7) Determine whether or not to end (Step 134).

Whether to end the process is determined by whether or not the predetermined time has passed or a stop signal is supplied to the actuator controller. This may be executed between other Steps. (Although Step 136 is included in FIG. 11, this step is not utilized in the present embodiment).

This embodiment enables a test which duplicates actual vehicle running test, without using the actual body, and also allows the function of the suspension system to be evaluated economically. Further, it allows the performance with respect to various use conditions and body conditions to be evaluated simply by changing the body numerical model data.

Figure 12:
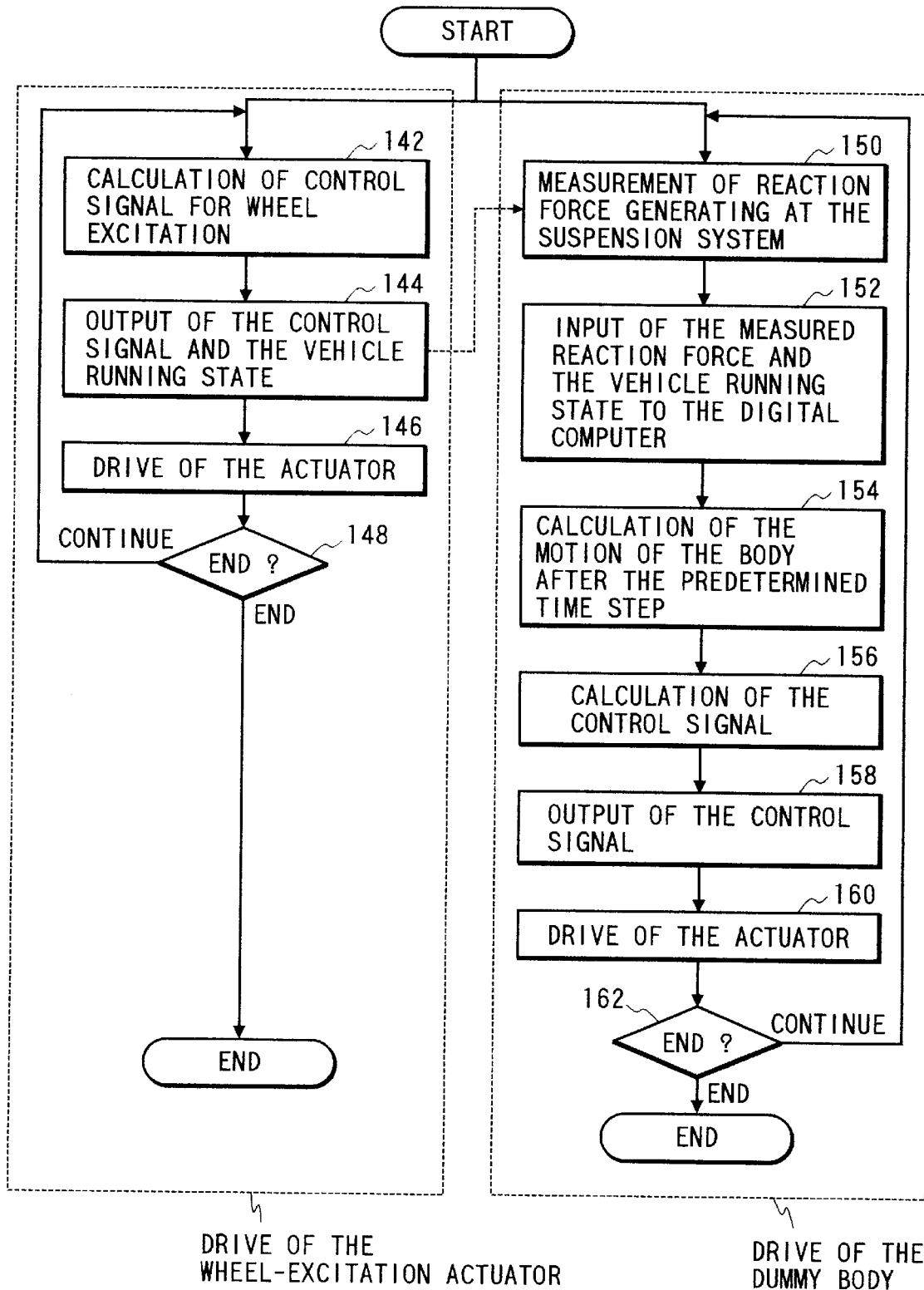
FIG. 12 is a flowchart of another embodiment of the vehicle testing method of the present invention.

Another embodiment of the method for testing a vehicle suspension system of the present invention will be explained with reference to FIG. 12, which uses the system shown in FIG. 4. That is, the wheel is excited by the wheel excitation actuator while controlling the excitation by the following procedure by using the second digital computer.

(11) Calculate a control signal for wheel excitation by using previously stored data on vehicle running condition and road condition (Step 142);

(12) Output the control signal and a running state based on the value calculated in (11) (Step 144);

(13) Drive the actuator based on the control signal (Step 146);

(14) Determine whether or not to end (Step 148).

The determination of whether to end the process is made based on whether or not a predetermined time has passed or a stop signal is supplied to the actuator controller.

Meanwhile, the dummy body is driven through Steps of 150 to 162 which are similar to those shown in FIG. 11. However, this procedure differs from that of FIG. 11 in that the running state is input in addition to the measured value of reaction force in Step 144, and the operation of control thereafter is carried out by using these values and the reaction force measured in Step 150. On the wheel side, the wheel motion is calculated by using the running condition and road condition in Step 142.

Because the exciting condition is set by combining the running condition and road surface condition data in the present embodiment, the motion may be readily tested under various conditions, just by changing those data. Further, it allows the test to be conducted at high precision because the inertia, centrifugal and other forces which vary depending on the running condition are added in calculating the body motion.

Figure 13:
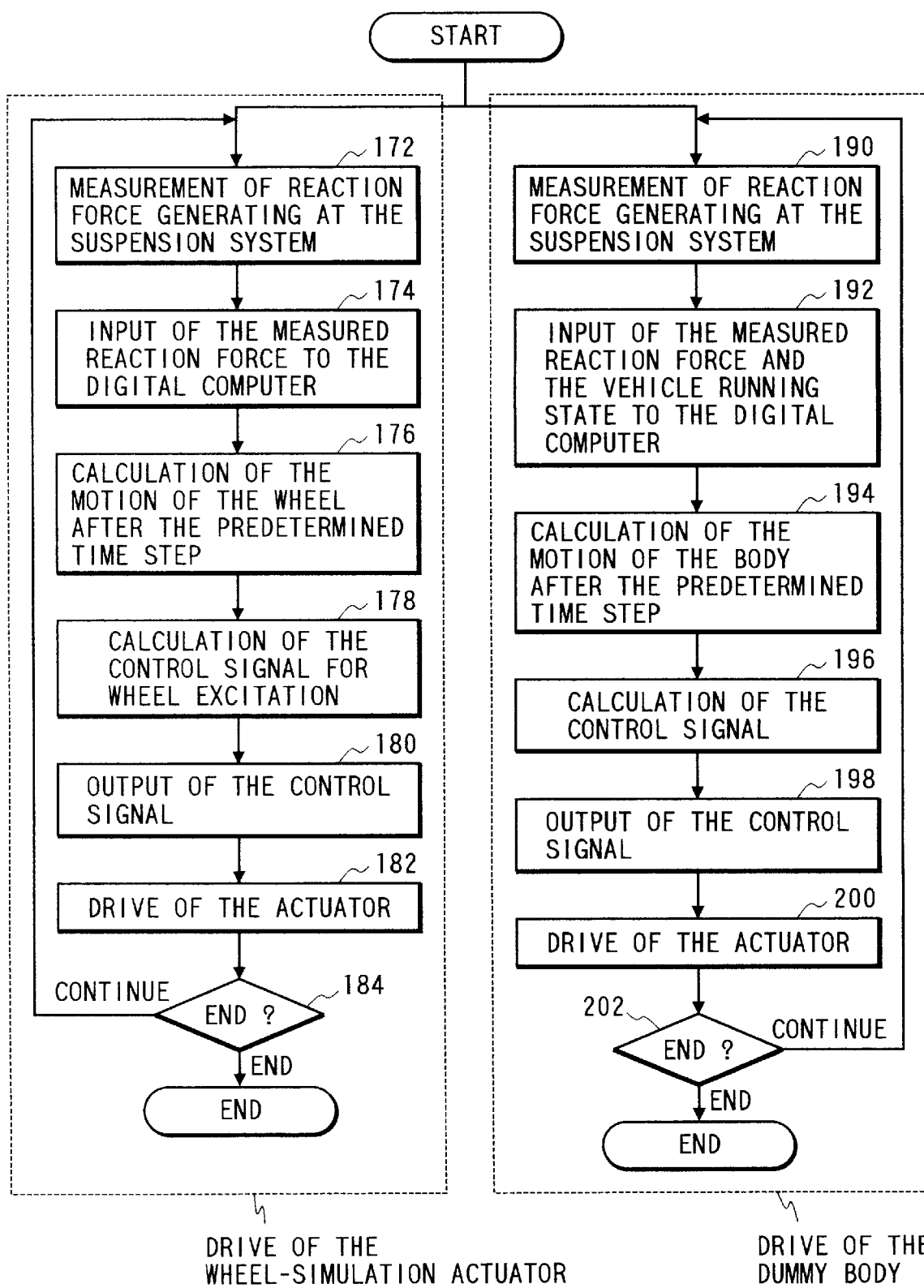
FIG. 13 is a flowchart of still another embodiment of the vehicle testing method of the present invention.

An inventive method for testing the vehicle suspension system by using the system shown in FIG. 6 will be explained below with reference to FIG. 13. One end of the suspension system 1, which is originally normally connected to a wheel, is connected with one or a plurality of actuators 7 for simulating wheel motion, the latter being fixed to the bases 8 via the reaction measuring means 41. The other end of the suspension system is connected to the dummy body equipped with the frame 5 and one or a plurality of actuators 4 connected to the frame 5 and fixed to the rigid walls 3. The wheel simulation-actuator side is excited in Steps 172 through 184 and the dummy-body side is excited in Steps 190 through 202. The procedures are as follows:

(21) Measure reaction force generated from the suspension system (Step 172);

(22) Input a measured value of the reaction force to the digital computer (Step 174);

(23) Calculate a wheel motion after a predetermined time following measurement of the reaction, by using previously stored data on wheel exciting state and the measured value of reaction obtained in Step (22), based on the wheel numerical model data input to the digital computer beforehand (Step 176);

(24) Calculate a control signal for the actuators which causes the motion at the part linked with the suspension system, based on the calculated result of the wheel motion (Step 178);

(25) Output the control signal (Step 180);

(26) Drive the actuator based on the control signal (Step 182); and

(27) Determine whether or not to end (Step 184).

The dummy body is driven simultaneously with the excitation of the wheel. Because its procedure (Steps 190 through 202) is the same as that explained with reference to FIG. 11, its explanation is omitted here.

The present embodiment allows the wheel motion to be found, in addition to the body motion, from the numerical calculation. Further, the present embodiment allows the test to be conducted efficiently because the condition between the wheel and the road surface may be set simply by changing the preset numerical values, and the condition may be readily changed as well.

Figure 14:
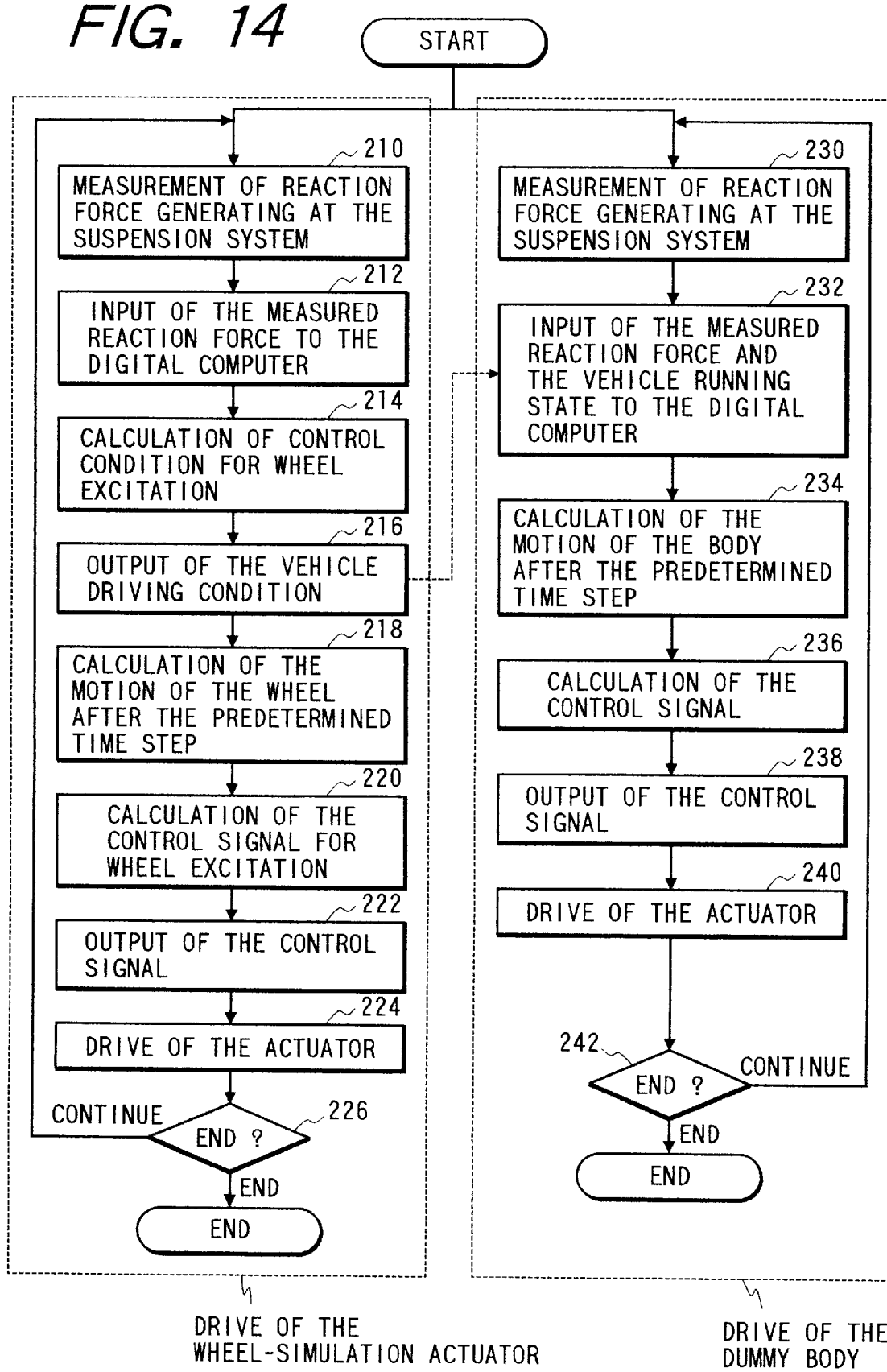
FIG. 14 is a flowchart of still another embodiment of the vehicle testing method of the present invention.

Another example of the testing method for testing the vehicle suspension system using the system shown in FIG. 8 will be explained below with reference to FIG. 14. The suspension system is excited by simulating wheel motion in Steps 210 through 226 and the dummy body is driven in Steps 230 through 242. Because the procedure for driving the dummy body is the same as that shown in FIGS. 12 and 13, its explanation is omitted here. In the embodiment shown in FIG. 13, the procedure for driving the actuator to stimulate wheel motion includes the following Steps.

(22a) Calculate data on wheel exciting state by using previously stored body running state and road surface condition data (Step 214); and (22b) Output the running state (Step 216).

In driving the dummy body, the body motion after a predetermined period following measurement of the reaction is calculated based on the running condition and the measured reaction.

Because the exciting condition is set by combining the data on the running state and the road surface condition in the present embodiment (similarly to the embodiment shown in FIG. 12), the test may be carried out readily under various conditions, simply by modifying those data. Further, the present embodiment allows the test to be conducted at high precision because inertia, centrifugal and other forces which vary depending on the running condition are added in calculating the body motion.

Still another inventive testing method for testing the vehicle suspension system will be explained below with reference to FIG. 11, in which Step 136 for outputting the calculation result of the body motion after the predetermined time is newly added, to excite the dummy body in the embodiments shown in FIGS. 12 through 14. This signal is supplied as the feedback signal to the suspension system which is being tested.

The present embodiment enables a performance test of the suspension system in which the status of body motion is given as the feedback signal, without using the actual car.

Several variations of the inventive testing system for testing the vehicle suspension system will be explained below with reference to FIGS. 15 through 18.

Figure 15:
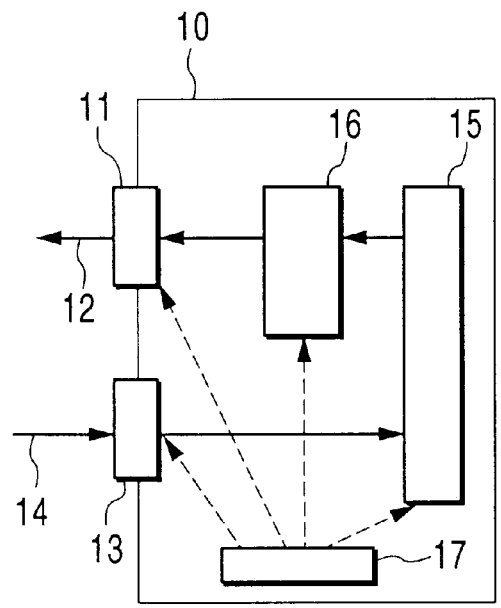
FIG. 15 is a detailed block diagram of a digital computer for use in the fifth embodiment of vehicle testing system of the present invention.

FIG. 15 is a detailed block diagram of the digital computer 10 for computing the exciting command to be input to the second actuator 4 for exciting the body in the sixth embodiment of the present invention shown in FIG. 6. This digital computer 10 functions in the same manner with those shown in FIGS. 2 through 4.

Figure 16:
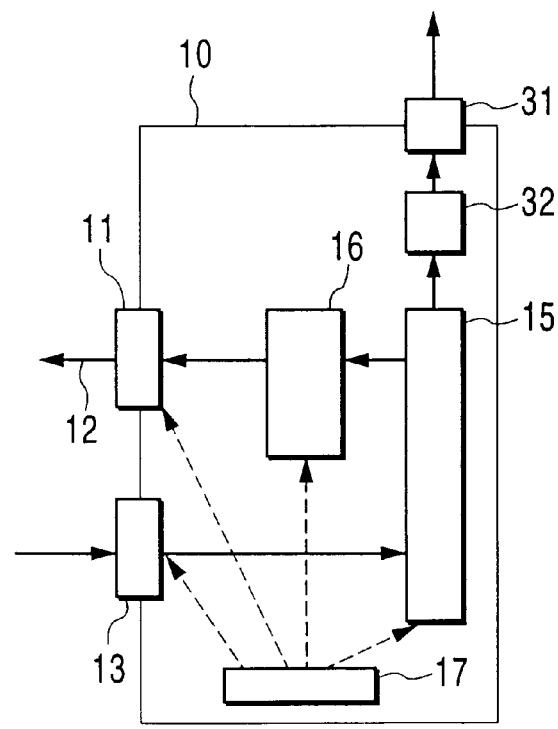
FIG. 16 is a block diagram showing a variation of the fifth embodiment of the vehicle testing system of the present invention.

FIG. 16 shows a variation of the embodiment of FIG. 15, wherein the content of the digital computer 10 on the body side is different from that shown embodiment, the body motion in FIG. 15. In the present calculated by the body motion calculating unit 15 is output also to the signal output unit 31 via second signal calculating unit 32. Thereby, the calculation result of the body motion may be output from the computer.

Figure 17:
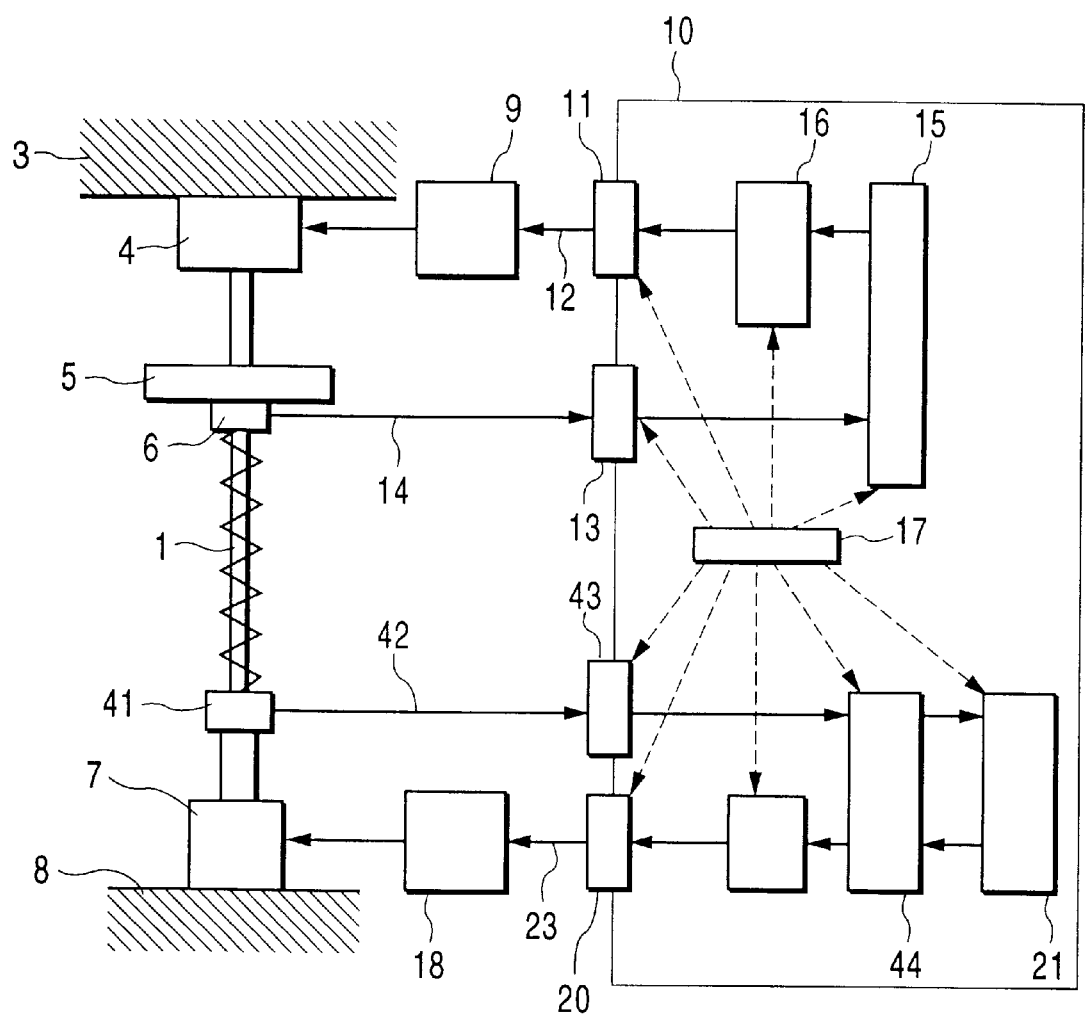
FIG. 17 is a block diagram showing a variation of the seventh embodiment of the vehicle testing system of the present invention.

FIG. 17 shows a variation of the eighth embodiment (FIG. 9), wherein the wheel is modeled, instead of exciting the wheel 2, and the exciting state is controlled by using the output of a reaction measuring device 41. The present variation allows the various running states to be changed simply by changing the operating conditions processed within the computer, because the vehicle suspension system is excited by modeling it.

FIG. 18 shows a variation of the second embodiment shown in FIG. 2, detailing a mechanism for matching the calculation result of the body motion calculating means with the motion at the connecting point. The digital computer 10 is provided with a displacement signal measuring unit 61 to input the measured result via a data input device 62 and to compare the measured result with the calculation result of the body motion calculating unit 15 by comparison unit 63, to correct the calculation result of the exciting signal calculating unit. This arrangement allows the calculation result after the predetermined time to agree with the actual motion.

Although the above description and the appended drawings describe the case in which the suspension system (or the suspension system and the wheel), i.e. the specimen, is excited alone, a plurality of suspension systems or wheels connected to one axle may be adopted as a single specimen. Further, all suspension systems and wheels attached to one body may be adopted as the specimen. Further, although the case of using the uniaxial actuator has been shown, the present invention is not so confined. Rather, it is desirable to excite with a plurality of degrees of freedom by a plurality of actuators, as in the case when it is required in realizing the body motion by using the numerical model. It is also desirable to measure the reaction force with a plurality of degrees of freedom. The method for exciting the wheel is not limited to those described above, and it is possible to adopt various methods. In short, various modifications within a scope of the spirit of the present invention are contained within the present invention.

According to the present invention described above, the actuator excites the wheel equipped with the suspension system by simulating the road surface condition and the computer calculates vibrational response of the body equipped with the suspension system, so that the performance test or durability test of the suspension system or the active suspension system, in particular, may be carried out under various conditions simply by changing, on the computer, the numerical calculation model or the road surface condition provided in the computer.

It is to be understood that the present invention is not confined only to the embodiments described above and that the variations thereto existing within the spirit and scope of the present invention shall be all contained within the following claims.

We claim:

1. A system for testing a vehicle by exciting the vehicle, comprising:

a dummy vehicle body having a frame;

at least one first exciting unit having one end fixed and another end connected with said frame;

reaction measuring means attached to said frame for measuring reaction force generated by a suspension system linked to said frame;

a digital computer for computing a driving signal to drive said first exciting unit based on a value of reaction force measured by said reaction measuring means; and a second exciting unit having one end fixed and another end disposed in contact with said suspension system.

2. The system according to claim 1, wherein said digital computer comprises:

storage means for storing vehicle body numerical models data which characterize the vehicle body;

body motion calculating means for calculating a motion of said body based on said body numerical model data; and time control means for controlling operations of said reaction measuring means and said body motion calculating means.

3. The vehicle testing system according to claim 1, wherein the second exciting unit comprises:

rotary pulleys;

a belt mounted on the pulleys; and an actuator for exciting the belt.

4. The vehicle testing system according to claim 1, wherein said digital computer has output means for outputting a calculation result of the body motion to the outside unit at a predetermined timing.

5. The vehicle testing system according to claim 2, wherein a second digital computer is connected to said second exciting unit, and said second digital computer comprises:

a memory for storing data concerning vehicle running conditions and road surface conditions;

exciting signal calculating means for outputting a signal for operating said second exciting unit based on the stored running condition and road surface conditions data; and second time control means for controlling the operation of said second exciting unit.

6. The vehicle testing system according to claim 5, wherein:

said second exciting unit is provided with second reaction measuring means for measuring reaction by said second exciting unit; and said calculating means calculates a signal force generated exciting signal for operating said second exciting unit, based on an output of said second reaction measuring means.

7. The vehicle testing system according to claim 5, wherein the digital computer and the second digital computer are integrated.

8. A vehicle testing method for testing a vehicle suspension system by using a dummy vehicle body, comprising steps of:

measuring reaction force generated by said suspension system linked to said dummy body;

calculating a motion of said dummy body after a preset time following a measurement of the reaction force, which motion corresponds to a measured value of the reaction, based on previously stored body numerical model data;

calculating a signal for exciting said dummy body based on a calculated body motion; and outputting said exciting signal after said preset time.

9. The vehicle testing method according to claim 8, further comprising steps of:

calculating a wheel exciting signal for exciting a wheel by using previously stored data on vehicle running state and on road surface state; and outputting an exciting signal and a running state based on a calculated value of the exciting signal.

10. The vehicle testing method according to claim 8, wherein a calculated motion of said dummy body is output after the preset time, for feed back to said suspension system.

11. A vehicle testing method for testing a vehicle suspension system by using a dummy vehicle body, comprising steps of:

measuring a reaction force generated by said suspension system;

calculating a motion of a wheel after a preset time following a measurement of the reaction force, based on previously stored data on wheel exciting state and on a measured value of the reaction force with respect to a wheel numerical model stored in advance;

determining an exciting signal for causing a motion of a part linking said suspension system and said wheel to agree with the calculated wheel motion;

outputting said exciting signal after the preset time;

calculating a motion of the body after the preset time following measurement of the reaction force, based on a measured value of the reaction force by using previously stored body numerical model;

determining an exciting signal for causing the motion of said dummy body to agree with calculated body motion; and outputting said exciting signal after said preset time.

12. The vehicle testing method according to claim 11, wherein data on the wheel exciting state are calculated based on previously stored data on vehicle running state and road surface state.

13. The vehicle testing method according to claim 12, wherein the calculation result of the motion of said dummy body is output after the preset time, for feed back to said suspension system.

* * * * *